(12) United States Patent
Peck, Jr.

(10) Patent No.: US 6,219,477 B1
(45) Date of Patent: Apr. 17, 2001

(54) MULTIPORT SINGLE PATH OPTICAL SYSTEM AND ASSOCIATED METHOD

(75) Inventor: James L. Peck, Jr., Huntington Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/342,437

(22) Filed: Jun. 29, 1999

(51) Int. Cl.[7] .............................. G02B 6/32; H04B 10/00
(52) U.S. Cl. ................................ 385/34; 385/31; 385/33; 385/44; 385/46; 385/88; 385/89; 359/131; 359/152
(58) Field of Search ................................ 385/15, 27, 31, 385/33, 34, 39, 42, 44, 46, 88, 89, 93; 359/131, 152, 154, 173

(56) References Cited

U.S. PATENT DOCUMENTS

| | | | |
|---|---|---|---|
| 4,550,975 | * 11/1985 | Levinson et al. | 385/34 |
| 5,559,911 | * 9/1996 | Forkner et al. | 385/33 |
| 5,629,995 | * 5/1997 | Duck et al. | 385/24 |
| 5,666,448 | 9/1997 | Schoenwald et al. | 385/44 |
| 5,751,870 | * 5/1998 | Forkner et al. | 385/33 |
| 5,757,994 | 5/1998 | Schoenwald et al. | 385/44 |
| 5,761,357 | 6/1998 | Peck, Jr. | 385/44 |
| 5,809,187 | 9/1998 | Peck, Jr. et al. | 385/24 |
| 5,883,993 | 3/1999 | Peck, Jr. | 385/44 |
| 5,892,868 | 4/1999 | Peck, Jr. et al. | 385/34 |
| 5,894,534 | 4/1999 | Peck, Jr. | 385/44 |
| 6,055,347 | * 4/2000 | Li et al. | 385/34 |
| 6,069,987 | * 5/2000 | Sasaki et al. | 385/24 |

* cited by examiner

*Primary Examiner*—Brian Healy
(74) *Attorney, Agent, or Firm*—Alston & Bird LLP

(57) ABSTRACT

In an optic fiber, different first and second optical signals are transmitted through optic fiber in the first direction. The first optical signal may be infrared, whereas the second optical signal may be visible, so as to provide a visible indication that optical energy is propagating through the optic fiber. The optic fiber is connected to an optical system that includes a transceiving GRIN lens, a receiving GRIN lens and a plurality of transmitting GRIN lenses that are smaller than the receiving GRIN lens. The transceiving GRIN lens has opposite first and second ends, collimates optical signals propagating therethrough and emitted via the first end, and focuses optical signals propagating therethrough and emitted via the second end. The receiving GRIN lens has opposite first and second ends, and focuses optical signals propagating therethrough and emitted via the second end thereof. The first end of the receiving GRIN lens is optically connected to the first end of the transceiving GRIN lens such that the transceiving GRIN lens is operative for transferring collimated optical energy to the second GRIN lens. Each of the transmitting GRIN lenses has opposite first and second ends, and collimates optical signals propagating therethrough and emitted via the first end thereof. The first end of each of the transmitting GRIN lenses is optically connected to the first end of the transceiving GRIN lens such that the transceiving GRIN lens is operative for receiving collimated optical signals from each of the transmitting GRIN lenses.

12 Claims, 2 Drawing Sheets

MULTIPORT SINGLE PATH OPTICAL SYSTEM AND ASSOCIATED METHOD

FIELD OF THE INVENTION

The present invention relates generally to couplers for fiber optic cables and, more particularly, to methods and apparatus for multiplexing on a single optic fiber.

BACKGROUND OF THE INVENTION

It is well known to use fiber optic systems to transfer, data, audio, video or other signals. Fiber optic systems have a number of features that make them superior, in some applications, to systems that use traditional copper cables, or the like. For example, fiber optic systems can have much larger information-carrying capability and are not subject to electrical interference. In addition, signals sent over long-distance optic fibers need less amplification than do signals sent over copper cables of equal length.

In a fiber optic system, it is typical for a transmitter assembly to convert an electrical signal to an optical signal that is introduced to one end of an optic fiber. A receiver assembly at the opposite end of the optic fiber receives and converts the optical signal to an electrical signal. In such a fiber optic system, it is common for optic fibers to be fused in a side-by-side arrangement for coupling purposes. An elongate section of one optic fiber is fused to an elongate section of another optic fiber so that optical signals flow between the fused fibers. Such a side-by-side fused interface, which can be characterized as a passive fusion coupler allows for good transfer of optical signals between the fused optic fibers, but provides no control over the amount of optical energy that is transferred, which can be disadvantageous in some applications.

It is also common for fiber optic systems to include powered couplers. A powered coupler includes an optical receiver, such as a photo detector, that receives an optical signal, converts the optical signal into electronic data, and supplies the electronic data to another powered coupler that transmits an optical signal. Whereas powered couplers can detect data on one optic fiber and transmit the data on another optic fiber, some aspects of the original optical signal may be lost in the transfer, such as the energy level or frequency level of the original optical signal, which can be disadvantageous in some applications.

Further, optical signals are often infrared and, therefore, not readily visible. As a result, technicians, or the like, that are troubleshooting, servicing or are otherwise in contact with an optic fiber carrying an infrared signal of certain characteristics may unknowingly be harmed by exposure to the infrared signal. This is a further disadvantage to the use of fiber optic systems.

SUMMARY OF THE INVENTION

The present invention solves the above problems, and other problems, by providing methods and apparatus for facilitating the transmission of multiple signals along a single optic fiber, which can be characterized as multiplexing. More specifically, in accordance with one aspect of the present invention, a first optical signal is transmitted along an optic fiber in a first direction and a second optical signal, which is different from the first optical signal, such as by having a different wavelength, is contemporaneously transmitted along the same optic fiber in the first direction, such that a segment of the optic fiber contemporaneously contains both of the first and second signals. The first optical signal may be infrared, whereas the second optical signal may be visible, so as to provide a visible indication that optical energy is propagating through the optic fiber. Additionally, other different optical signals may contemporaneously be transmitted along the optic fiber in the first direction or a second direction that is opposite from the first direction.

In accordance with another aspect of the present invention, the multiplexing is provided by way of an optic system that includes a transceiving optic device, a receiving optic device and a plurality of transmitting optic devices. Each of those optic devices is acceptably a gradient index lens, or the like. The transceiving optic device has opposite first and second ends, and is operative to collimate optical signals propagating therethrough and emitted via the first end thereof. The transceiving optic device is further operative to focus optical signals propagating therethrough and emitted via the second end thereof. The receiving optic device has opposite first and second ends, and is operative to focus optical signals propagating therethrough and emitted via the second end thereof. The first end of the receiving optic device is optically connected to the first end of the transceiving optic device such that the transceiving optic device is operative for directing collimated optical signals to the receiving optic device. Each of the transmitting optic devices also has opposite first and second ends and is operative to collimate optical signals propagating therethrough and emitted via the first end thereof. The first end of each of the transmitting optic devices is optically connected to the first end of the transceiving optic device such that the transceiving optic device is operative for receiving collimated optical signals from each of the transmitting optic devices. The first end of each of the transmitting optic devices is preferably substantially smaller than the first end of the receiving optic device such that substantially more optical energy is transferred from the transceiving optic device to the receiving optic device than from the transceiving optic device to any or all of the transmitting optic devices. Thus, control is maintained over the amount of optical energy that is transferred, such that a low loss is experienced in the transmission of one or more optical signals from the transceiving optic device to the receiving optic device.

In accordance with another aspect of the present invention, optical transducers are provided and operatively associated with the transmitting optical devices and the receiving optical device. One of the transducers receives optical signals from the receiving optic device, and in response at least one of the other transducers provides optical signals to at least one of the transmitting optic devices so that the system operates as a transceiver. Further, optic fibers may be operatively associated with each of the optical devices to provide optical connections therebetween.

The present invention provides for multiplexing on a single optic fiber, and one of the optical signals may be visible to provide an indication that the optic fiber is energized. Further, low optical energy losses are incurred at the location where multiple optical signals are introduced into the optic system that facilitates the multiplexing.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
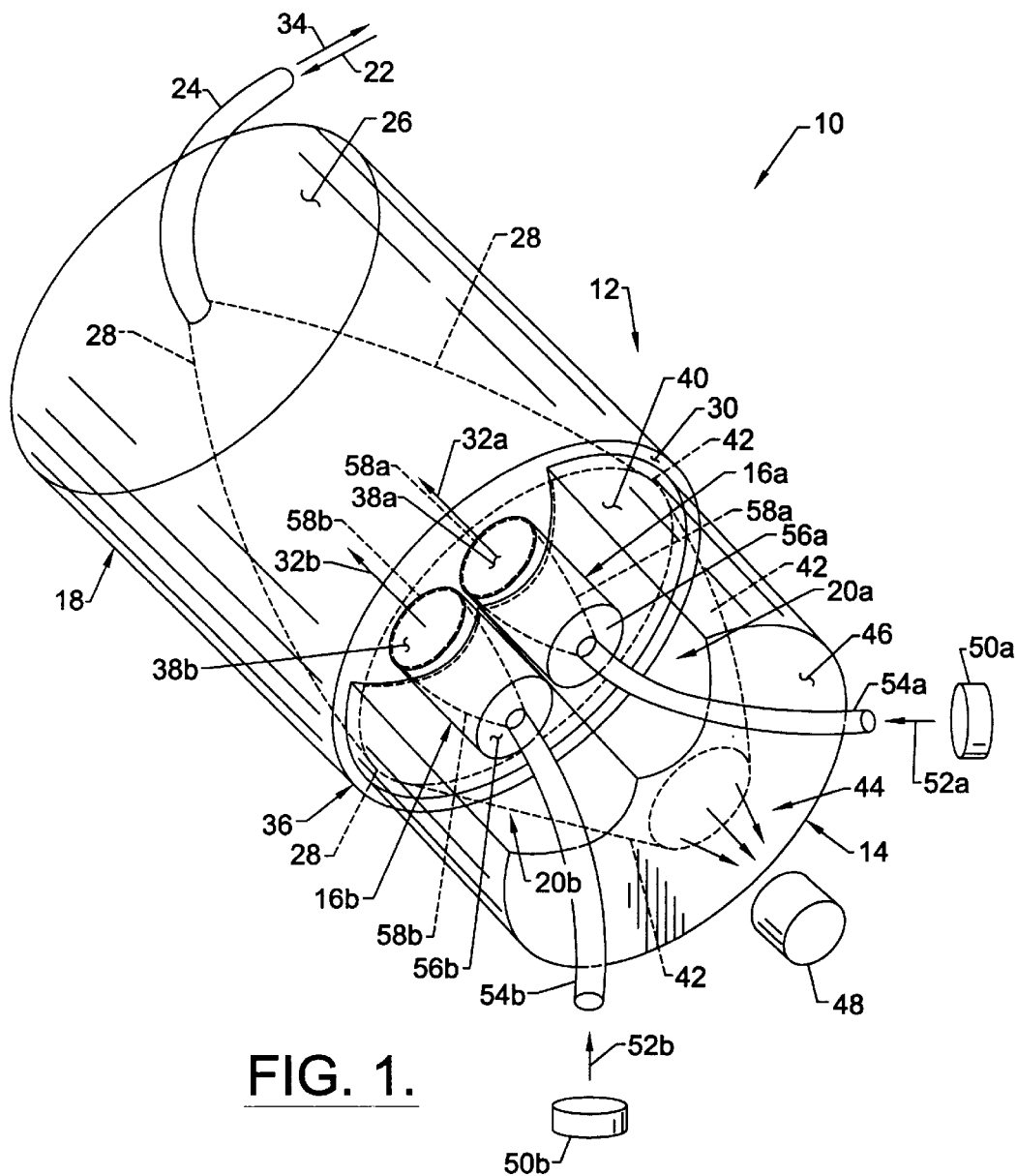
FIG. 1 is a diagrammatic perspective view of a multiport single path optical transceiver system according to an embodiment of the present invention.

Referring to FIG. 1, a multiport single path optical transceiver system 10 according to an embodiment of the present invention will be described. The transceiver system 10 includes a lens assembly 12 having multiple optic devices 14, 16a, 16b and 18, each of which has similar operational characteristics and can be characterized as having a focused end and a collimated end. Optical signals appropriately introduced from a point source, or the like, to the focused end of a representative one of the optic devices 14, 16a, 16b or 18 is collimated, whereas collimated optical signals appropriately introduced to the collimated end of the representative optic device are focused, as will be discussed in greater detail below. Throughout this disclosure, optical signals or energy should be understood to include optical signals of the type used in optical communication and/or power transmission, such as, but not limited to, signals in the visible and the infrared portion of the electromagnetic spectrum.

Each of the optic devices 14, 16a, 16b and 18 of the lens assembly 12 may be provided by a series of separate standard lenses, or the like. Nonetheless, in accordance with the embodiment of the present invention that is illustrated in FIG. 1, the optic devices 14, 16a, 16b and 18 are generally cylindrical gradient index (GRIN) lenses. GRIN lenses are conventional and known to those skilled in the art. Each of the GRIN lenses 14, 16a, 16b and 18 preferably functions so that a collimated optical signal appropriately entering the collimated end thereof is focused at a point that is a quarter of the wavelength of the optical signal from the collimated end. Similarly, each of the GRIN lenses 14, 16a, 16b and 18 preferably functions so that an optical signal appropriately entering the focused end thereof from a point source, or the like, is collimated at a point that is a quarter of the wavelength of the optical signal from the focused end.

The lens assembly 12 can be characterized as including a receiving GRIN lens 14 and a plurality of transmitting GRIN lenses 16a and 16b, each of which has a collimated end that is optically connected to the collimated end of a transceiving GRIN lens 18. Whereas only two transmitting GRIN lenses 16a and 16b are included in the illustrated embodiment of the present invention, other embodiments of the present invention include a greater number of transmitting GRIN lenses. In accordance with the illustrated embodiment of the present invention, the optical connections between the lenses 14, 16a, 16b and 18 are provided by mounting their collimated ends to one another, such as with conventional optical adhesives, or the like.

In accordance with the illustrated embodiment, separate axially extending cavities or notches 20a and 20b are defined in the receiving GRIN lens 14, for respectively housing the transmitting GRIN lenses 16a and 16b. The sizes of the notches 20a and 20b depicted in FIG. 1 are exaggerated so as to clarify the figure. Whereas the notches 20a and 20b are shown as being contiguous in FIG. 1, in accordance with another embodiment of the invention the notches, and therefore the transmitting GRIN lenses 16a and 16b, are more distant from one another than is illustrated. As will be discussed in greater detail below, the transmitting GRIN lenses 16a and 16b optically communicate with the transceiving GRIN lens 18. Even though the transmitting GRIN lenses 16a and 16b are shown within the notches 20a and 20b formed in the side of the receiving GRIN lens 14, other arrangements for providing optical communication between the transmitting GRIN lenses and the transceiving GRIN lens 18 are within the scope of the present invention. According to the illustrated embodiment of the present invention, the transceiver system 10 further includes optic fibers and optical energy transducers that cooperate with the lens assembly 12. For example, in accordance with the illustrated embodiment of the present invention, incoming optical signals 22, which are delivered by an optic fiber 24, arrive at the focused end 26 of the transceiving GRIN lens 18. The incoming optical signal 22 enters the focused end 26 of the transceiving GRIN lens 18 generally at the central axis of the transceiving GRIN lens 18 and perpendicular to the focused end 26. That is, the optical signal 22 delivered by the optic fiber 24 is imparted upon the focal center of the focused end 26 of the transceiving GRIN lens 18, as shown in dashed lines by generally conical propagation envelope 28. The transceiving GRIN lens 18 is preferably a quarter wave length GRIN lens so as to receive a point source of optical energy, or the like, at its focused end 26, and transmit a collimated beam at its collimated end 30, as shown by the propagation envelope 28.

There is a quarter wave length interface 36 between the collimated end 30 of the transceiving GRIN lens 18 and adjacent collimated ends 38a and 38b, respectively, of the transmitting GRIN lenses 16a and 16b. There is also a quarter wave length interface 36 between the collimated end 30 of the transceiving GRIN lens 18 and the collimated end 40 of the receiving GRIN lens 14. The concept of quarter wave length interfaces is known to those skilled in the art.

The collimated end 30 of the transceiving GRIN lens 18 transmits collimated optical energy through the quarter wave length interface 36 to the collimated end 40 of the receiving GRIN lens 14, and to the collimated ends 38a and 38b, respectively, of the transmitting GRIN lenses 16a and 16b. As will be discussed in greater detail below, the collimated ends 38a and 38b of the transmitting GRIN lenses 16a and 16b are relatively small compared to the collimated end 30 of the transceiving GRIN lens 18. Therefore, the transmitting GRIN lenses 16a and 16b receive only a small percentage of the optical signal being transmitted from the collimated end 30 of the transceiving GRIN lens 18. For example, each of the transmitting GRIN lenses 16a and 16b preferably receives no more than approximately four percent to eight percent, or more specifically no more than approximately five percent, of the optical energy being transmitted from the collimated end 30 of the transceiving GRIN lens 18.

The collimated optical energy entering the collimated end 40 of the receiving GRIN lens 14 is focused as shown in dashed lines by generally conical propagation envelope 42. The transceiving GRIN lens 18 and the receiving GRIN lens 14 are preferably coaxial so that the collimated ends of the propagation envelopes 28 and 42 are generally centered with respect to one another. A focused or somewhat focused optical signal 44 exits the focused end 46 of the receiving GRIN lens 14 and is incident on, and preferably focused upon, a detection element 48. The detection element 48 may be an optical energy receiver, such as a detector which changes impedance relative to the optical energy received. Such an optical detection element 48 transduces the optical signal 44 into electrical data, and such electrical data may have many different applications. Alternatively, an optic fiber (not shown) or other type of device that can receive and allow optical energy to propagate therethrough can connect the detection element 48 to the focused end 46 of the receiving GRIN lens 14.

A plurality of signals, which may be responsive to the optical signal 44, are respectively generated by a plurality of transducers 50. Whereas only two transducers 50a and 50b are included in the illustrated embodiment of the present invention, other embodiments of the present invention include a greater number of transducers and associated optic fibers 54a and 54b, and transmitting GRIN lenses 16a and 16b. Optical signals 52a and 52b respectively generated by the transducers 50a and 50b are delivered by respective optic fibers 54a and 54b so as to enter respective focused ends 56a and 56b of the transmitting GRIN lenses 16a and 16b. For each of the transmitting GRIN lenses 16a and 16b, the optical signals 52a and 52b enter at the central axis of the respective transmitting GRIN lens and perpendicular to the respective focused end 38a or 38b. The optical signals 52a and 52b are collimated within the respective transmitting GRIN lenses 16a and 16b, as shown in dashed lines by generally conical propagation envelopes 58a and 58b.

Figure 2:
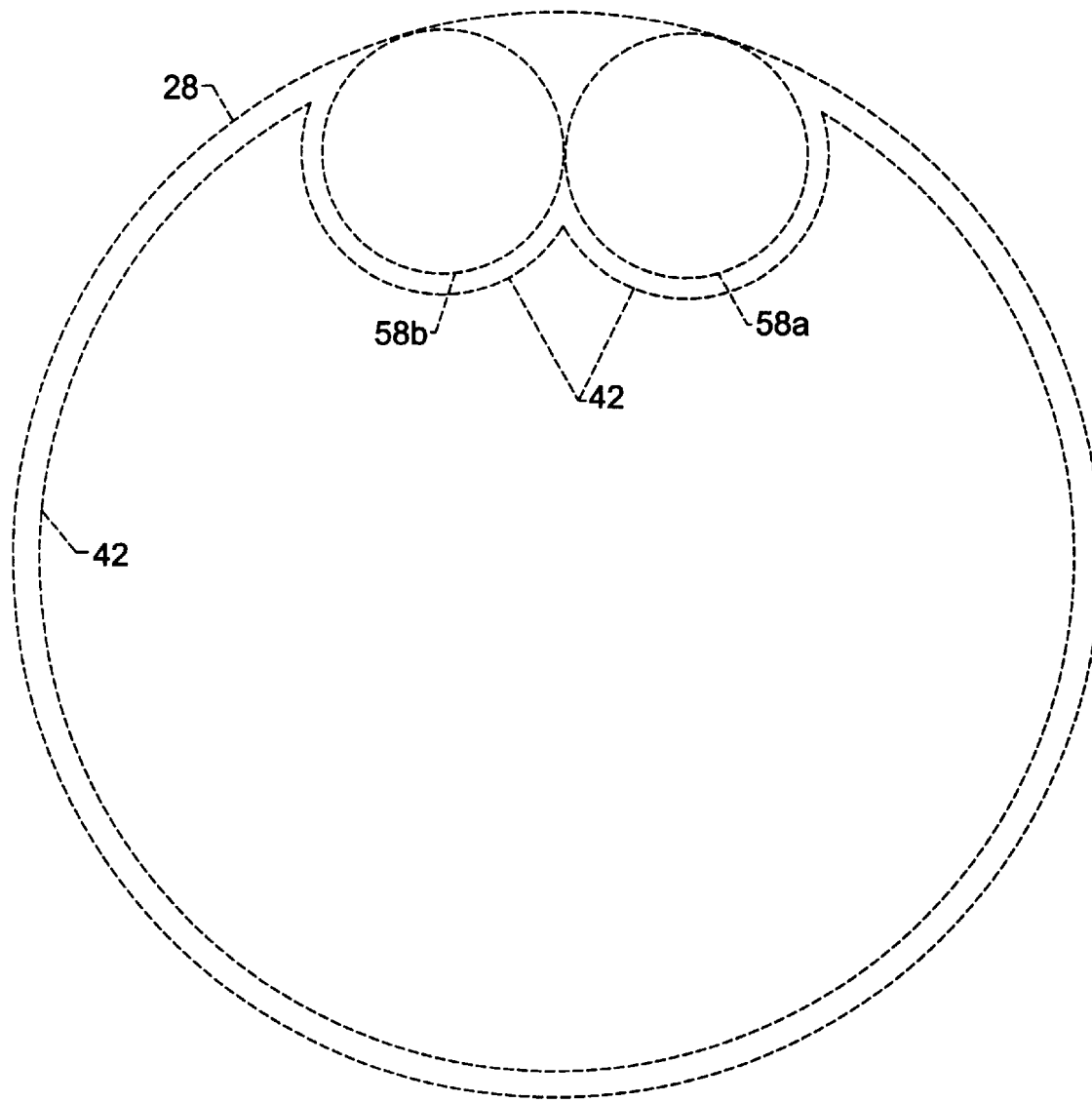
FIG. 2 is a diagrammatic, end elevation view of collimated ends of the propagation envelopes of the transceiver system of FIG. 1.

As best seen in FIG. 2, the entirety of the collimated ends of the propagation envelopes 58a and 58b are within the collimated end of the propagation envelope 28, and the peripheries of the collimated ends of the propagation envelopes 58a and 58b preferably touch the periphery of the propagation envelope 28. Further, the entirety of the collimated end of the propagation envelope 42 is preferably within, or does not extend beyond, the collimated end of the propagation envelope 28. In accordance with one embodiment of the present invention, the collimated end of the propagation envelope 58a bounds an area of approximately 0.785 mm$^2$, the collimated end of the propagation envelope 58b bounds an area of approximately 0.785 mm$^2$, the collimated end of the propagation envelope 28 bounds an area of approximately 19.625 mm$^2$, and the collimated end of the propagation envelope 42 bounds an area of approximately 18.082 mm$^2$. The immediately preceding dimensions are based on the transmitting GRIN lenses 16a and 16b (FIG. 1) each being a 1 mm GRIN lens, and the receiving GRIN lens 14 (FIG. 1) and the transceiving GRIN lens 18 (FIG. 1) each being a 5 mm GRIN lense. It is generally preferred for the area of the collimated end of the propagation envelope 42 of the receiving GRIN lens 14 to be maximized so as to minimize insertion losses associated with the optical signal 44 (FIG. 1).

As best seen in FIG. 1, collimated optical signals 32a and 32b respectively exit the transmitting GRIN lenses 16a and 16b at the collimated ends 38a and 38b thereof. Those collimated optical signals 32a and 32b travel through the quarter wave length interface 36 and perpendicularly enter the collimated end 30 of the transceiving GRIN lens 18. The optical signals 32a and 32b travel through the transceiving GRIN lens 18 along a path shown by the propagation envelope 28 to exit at the focused end 26 of the transceiving GRIN lens into the optic fiber 24 for propagating therealong as optical signal 34. The optical signal 34 includes both of the optical signals 32a and 32b. The transceiver system 10 supports bi-directional energy transmission, as can be seen, for example, with reference to the optic fiber 24. The optical signals 22 and 34 propagate in opposite directions through the optic fiber 24.

In accordance with an embodiment of the present invention, in response or reply to the receipt of optical signals 22 that are received by the transceiver system 10 via the optic fiber 24, optical signal 34, which contemporaneously comprises the optical signals 32a and 32b, is produced. It is preferable, but not required, for the optical signal 32a to have a different frequency and/or wavelength than the optical signal 32b, such that those signals can be multiplexed into a composite optical signal 34 that can be separated or demultiplexed downstream. Further, each of the optical signals 32a and 32b may embody the transmission of data, audio, video or other signals, and it is preferred that the information embodied by the signal 32a is different than the information embodied by the signal 32b. Alternatively, in some applications it may be desirable for the optical signals 32a and 32b to embody identical information yet still be multiplexed.

In accordance with another embodiment of the present invention, only one of the optical signals 32a and 32b embodies the transmission of speech, data, video or other information, or the like, whereas the other of the optical signals 32a and 32b embodies a "safety light," or the like. For example, the optical signal 32a may be infrared, whereas the optical signal 32b may be visible. Such a visible signal 32b would be advantageous, for example, when technicians, or the like, are troubleshooting or otherwise in contact with an optic fiber. By providing a readily visible notice that an optic cable is energized, the visible signal 32b may reduce injuries, such as eye-damage caused by non-visible infrared signals 32a. The visible optical signal 32b may also embody the transmission of data, audio, video or other information.

In an alternative embodiment of the present invention, results discussed above are achieved without the optic fibers 54a and 54b. In accordance with this alternative embodiment, the transducers 50a and 50b may be directly optically connected with the respective focused ends 56a and 56b of the transmitting GRIN lenses 16a and 16b.

As mentioned above, the collimated ends 38a and 38b of the transmitting GRIN lenses 16a and 16b are relatively small compared to the collimated end 30 of the transceiving GRIN lens 18. Further, the collimated end 40 of the receiving GRIN lens 14 is approximately the same size as, or almost the same size as, the collimated end 30 of the transceiving GRIN lens 18, so that a large percentage of the optical energy exiting the collimated end 30 is incident on the collimated end 40 and focused as shown by the propagation envelope 42 onto the detection element 48. Therefore, the transmitting GRIN lenses 16a and 16b do not interfere much with the optical energy being transmitted from the collimated end 30 of the transceiving GRIN lens 18 to the collimated end 40 of the receiving GRIN lens 14, such that there is low loss along the communication path of the transceiver system 10 that terminates at the detection element 48.

The optical energy exiting the collimated end 30 of the transceiving GRIN lens 18 and received by the collimated ends 38a and 38b of the transmitting GRIN lenses 16a and 16b is not acted on and does not interfere with the optical energy generating devices 50a and 50b, which respectively provide optical signals 52a and 52b to the transmitting GRIN lenses 16a and 16b. Additionally, all of the optical energy exiting the collimated ends 38a and 38b of the transmitting GRIN lenses 16a and 16b enters the collimated end 30 of the transceiving GRIN lens 18 for being transmitted as optical signal 34 on the optic fiber 24.

In accordance with the present invention, multiplexing is achieved through the use of a passive optic device that is operative so that low energy losses are caused by the introduction of optical signals into the optic device. Further, one of the multiplexed signals may be visible, so as to provide a visible indication that the optic fiber carrying the multiplexed signals is energized.

Many modifications and other embodiments of the invention will come to mind to one skilled in the art to which this invention pertains having the benefit of the teachings presented in the foregoing descriptions and the associated drawing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optic system, comprising:
   a transceiving optic device having opposite first and second ends, and operative to collimate optical signals propagating therethrough and emitted via the first end and to focus optical signals propagating therethrough and emitted via the second end;
   a receiving optic device having opposite first and second ends, and operative to focus optical signals propagating therethrough and emitted via the second end thereof, wherein the first end of the receiving optic device is optically connected to the first end of the transceiving optic device such that the transceiving optic device is operative for transferring collimated optical energy to the receiving optic device; and
   a plurality of transmitting optic devices, each having opposite first and second ends and operative to collimate optical signals propagating therethrough and emitted via the first end thereof, wherein the first end of each of the transmitting optic devices is optically connected to the first end of the transceiving optic device such that the transceiving optic device is operative for receiving collimated optical energy from each of the transmitting of optic devices, and
   wherein the first end of at least one of the transmitting optic devices is substantially smaller than the first end of the receiving optic device such that substantially more optical energy is transferred from the transceiving optic device to the receiving optic device than from the transceiving optic device to at least one of the transmitting optic devices.

2. An optic system according to claim 1, further comprising:
   a third optic device operative for introducing a first optical signal into the second end of at least one of the transmitting optic devices so that the first optical signal is collimated and transmitted to the transceiving optic device; and
   a fourth optic device operative for introducing a second optical signal into the second end of at least another of the transmitting optic devices so that the second optical signal is collimated and transmitted to the transceiving optic device, wherein the first and second signals are different and the optical system is operative so that the first and second signals contemporaneously propagate through the first optic device.

3. An optic system according to claim 1, wherein:
   the third optic device is operative so that the first optical signal is infrared; and
   the fourth optic device is operative so that the second optical signal is visible.

4. An optic system according to claim 1, wherein the transceiving optic device comprises a first gradient index lens, the receiving optic device comprises a second gradient index lens, and the transmitting optic devices comprise a plurality of gradient index lenses.

5. An optic system, comprising:
   a first optic device having opposite first and second ends, and operative to collimate optical signals propagating therethrough and emitted via the first end and to focus optical signals propagating therethrough and emitted via the second end;
   a second optic device having opposite first and second ends, and operative to focus optical signals propagating therethrough and being emitted via the second end thereof, wherein the first end of the second optic device is optically connected to the first end of the first optic device such that the first optic device is operative for transferring collimated optical signals to the second optic device; and
   a plurality of optic devices, each having opposite first and second ends and operative to collimate optical signals propagating therethrough and emitted via the first end thereof, wherein the first end of each of the plurality of optic devices is optically connected to the first end of the first optic device such that the first optic device is operative for receiving collimated optical energy from each of the plurality of optic devices,
   wherein the first end of each of the plurality of optic devices is smaller than the first end of the second optic device such that each of the plurality of optic devices receives no more than approximately eight percent of optical energy being emitted via the second end of the first optic device.

6. An optic system according to claim 5, further comprising an optical energy detection element which functions as a transducer operative for receiving optical signals from the second end of the second optic device.

7. An optic system according to claim 5, wherein the first optic device comprises a first gradient index lens, the second optic device comprises a second gradient index lens, and the plurality of optic devices comprises a plurality of gradient index lenses.

8. An optic system according to claim 7, wherein the first gradient index lens defines at least one cavity and at least one of the gradient index lenses of the plurality of gradient index lenses is at least partially within the cavity.

9. An optic system according to claim 5, further comprising:
   a third optic device operative for introducing a first optical signal into the second end of at least one of the plurality of optic devices; and
   a fourth optic device operative for introducing a second optical signal into the second end of at least another of the plurality of optic devices, wherein the first and second signals are different and the optical system is operative so that the first and second signals contemporaneously propagate through the first optic device.

10. An optic system according to claim 9, further comprising an optic fiber that is optically connected to the second end of the first optic device, wherein the first optic device is operative to transfer optical energy into the optic fiber, whereby the first and second signals contemporaneously propagate through the optic fiber.

11. An optic system according to claim 9, wherein:
    the third optic device is operative so that the first optical signal is infrared; and the fourth optic device is operative so that the second optical signal is visible.

12. A method of transmitting optical signals along an optic fiber, comprising the steps of:

transmitting an infrared signal through the optic fiber in a first direction;

transmitting a visible signal through the optic fiber in the first direction such that a segment of the optic fiber contemporaneously contains both the infrared signal and the visible signal; and transmitting at least a third optical signal along the optic fiber in a second direction that is opposite from the first direction such that the segment of the optic fiber contemporaneously contains each of the infrared, visible and third signals.

* * * * *